March 29, 1955
R. A. NYE
2,705,181
AUTOMATIC DELIVERY AND FILING APPARATUS
Filed March 3, 1949
8 Sheets-Sheet 2
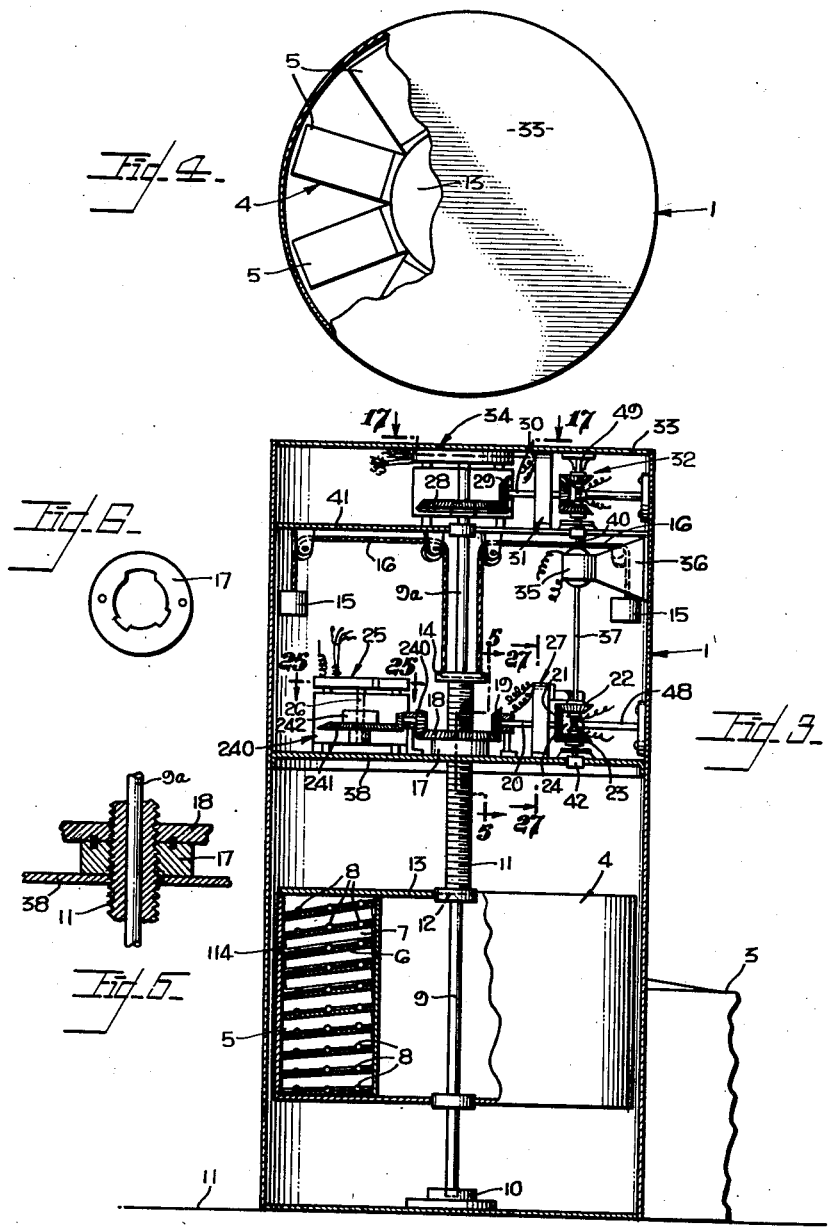
INVENTOR.
RALPH A. NYE
BY Francis D. Thurman
ATTORNEY

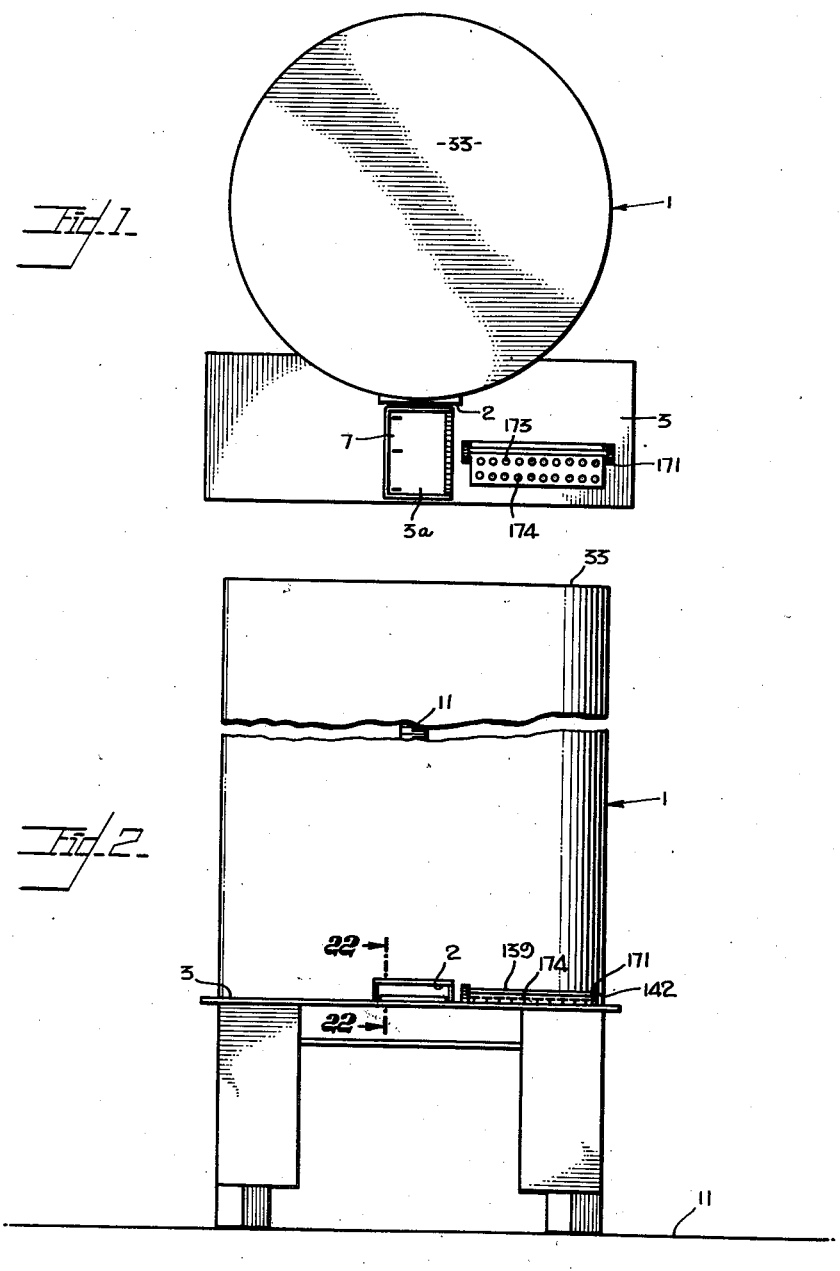

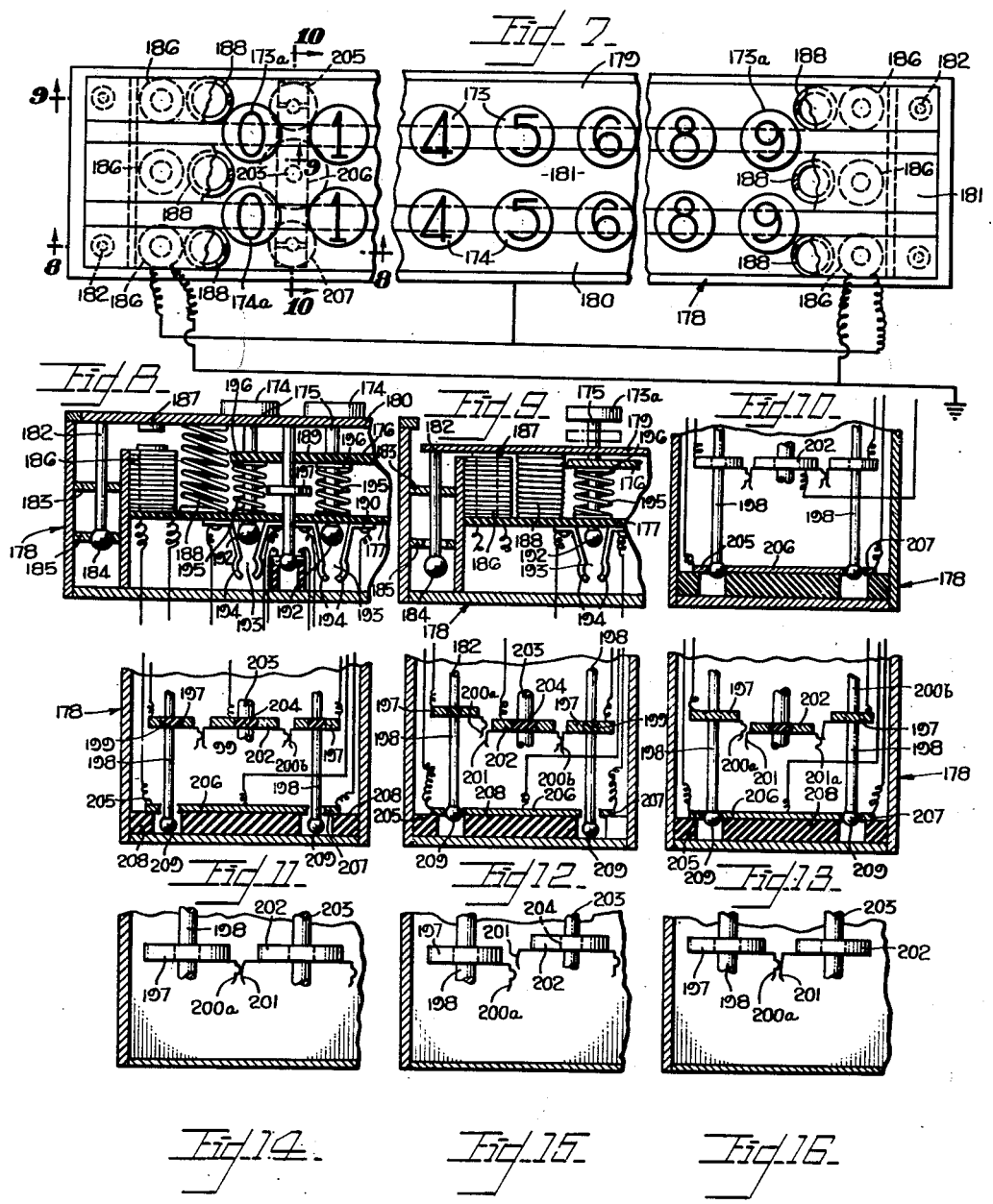

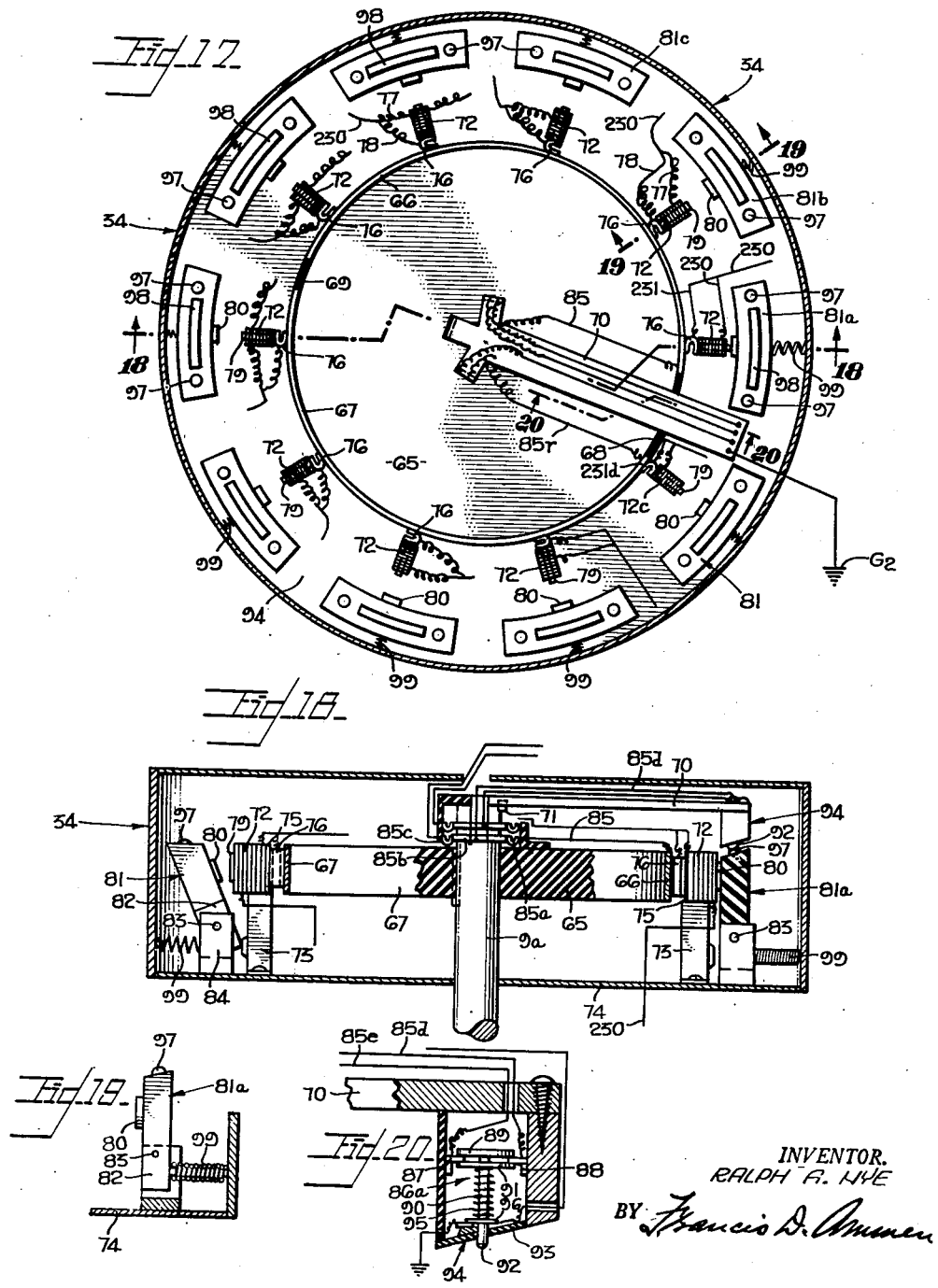

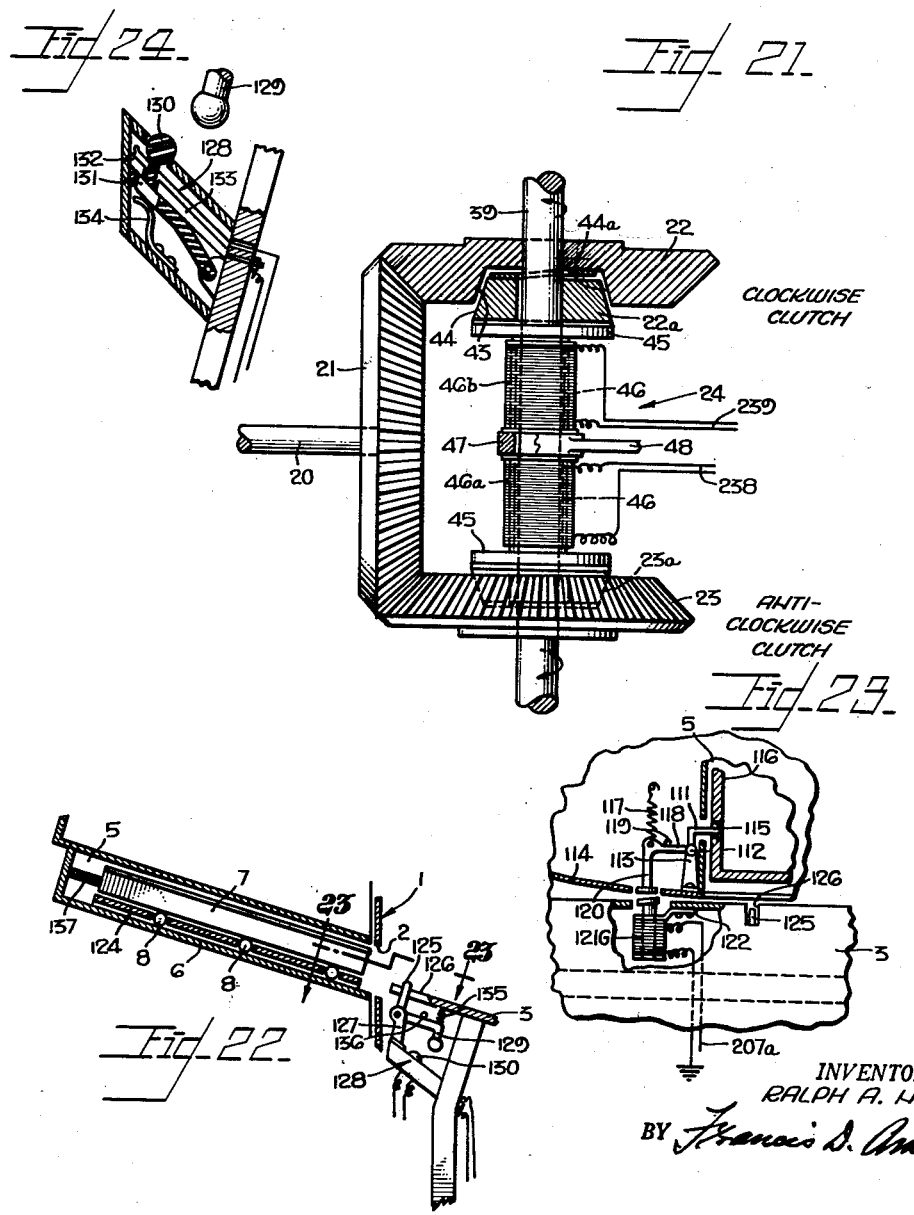

March 29, 1955  R. A. NYE  2,705,181
AUTOMATIC DELIVERY AND FILING APPARATUS
Filed March 3, 1949  8 Sheets-Sheet 6
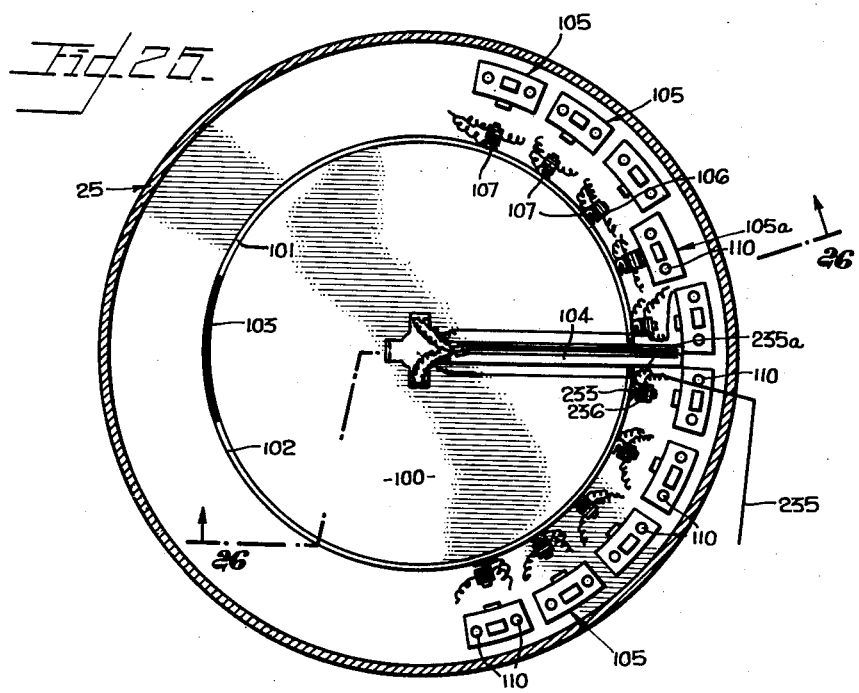
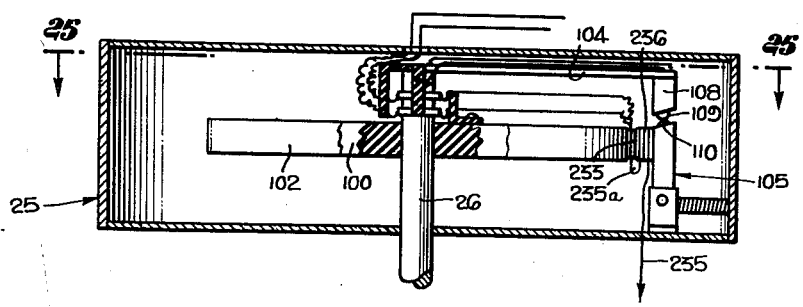
INVENTOR.
RALPH A. NYE
BY
ATTORNEY March 29, 1955 R. A. NYE 2,705,181
AUTOMATIC DELIVERY AND FILING APPARATUS
Filed March 3, 1949 8 Sheets-Sheet 7
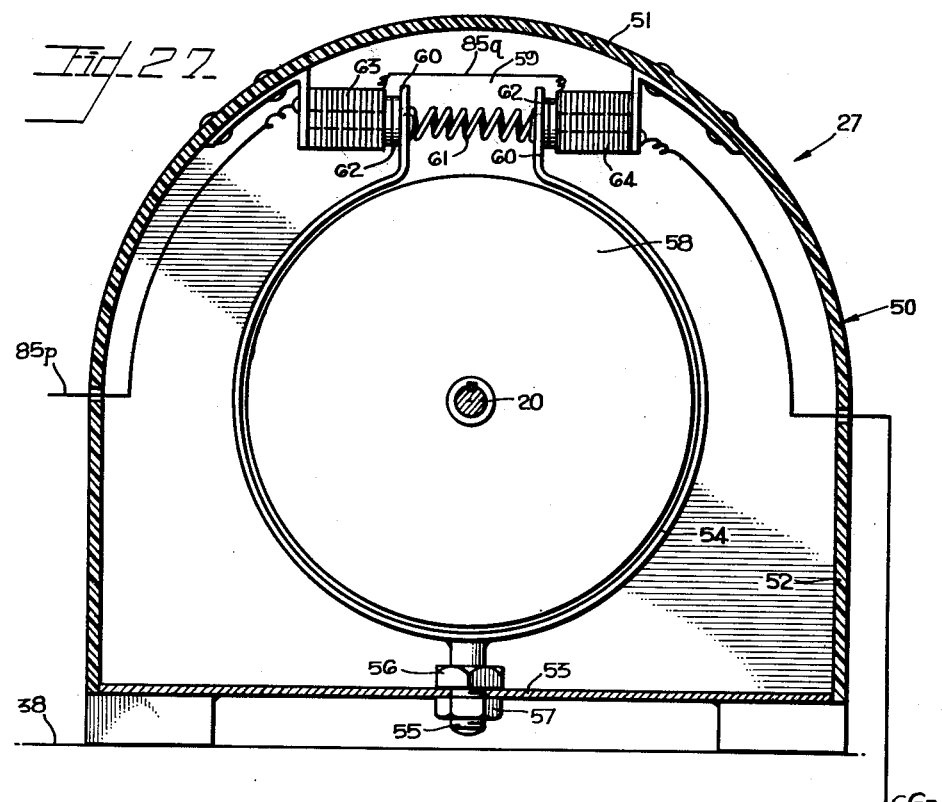
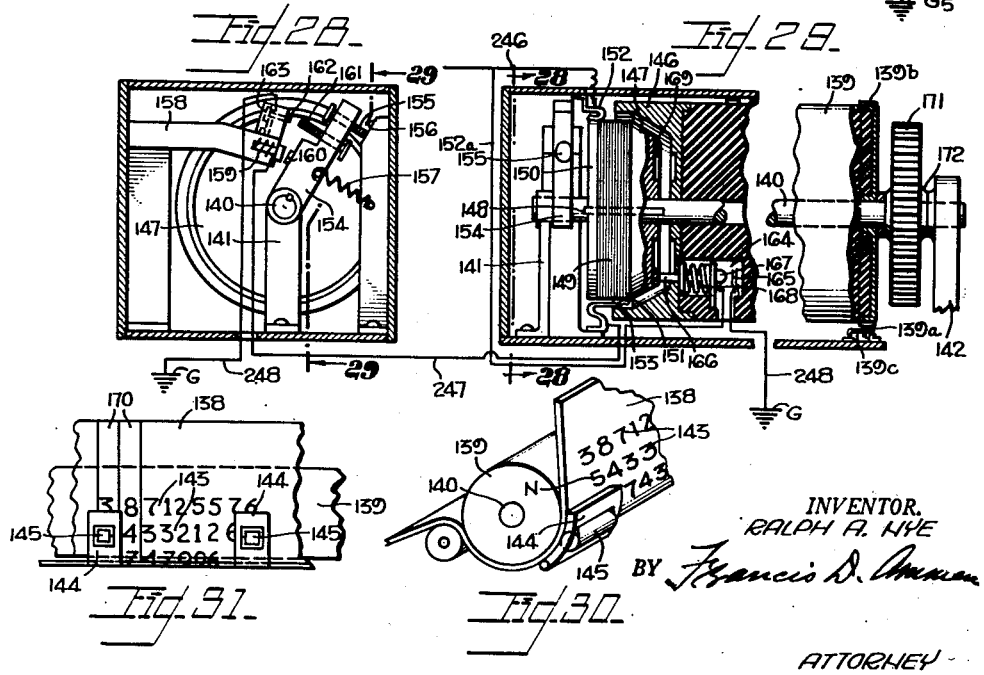
INVENTOR.
RALPH A. NYE
BY
ATTORNEY

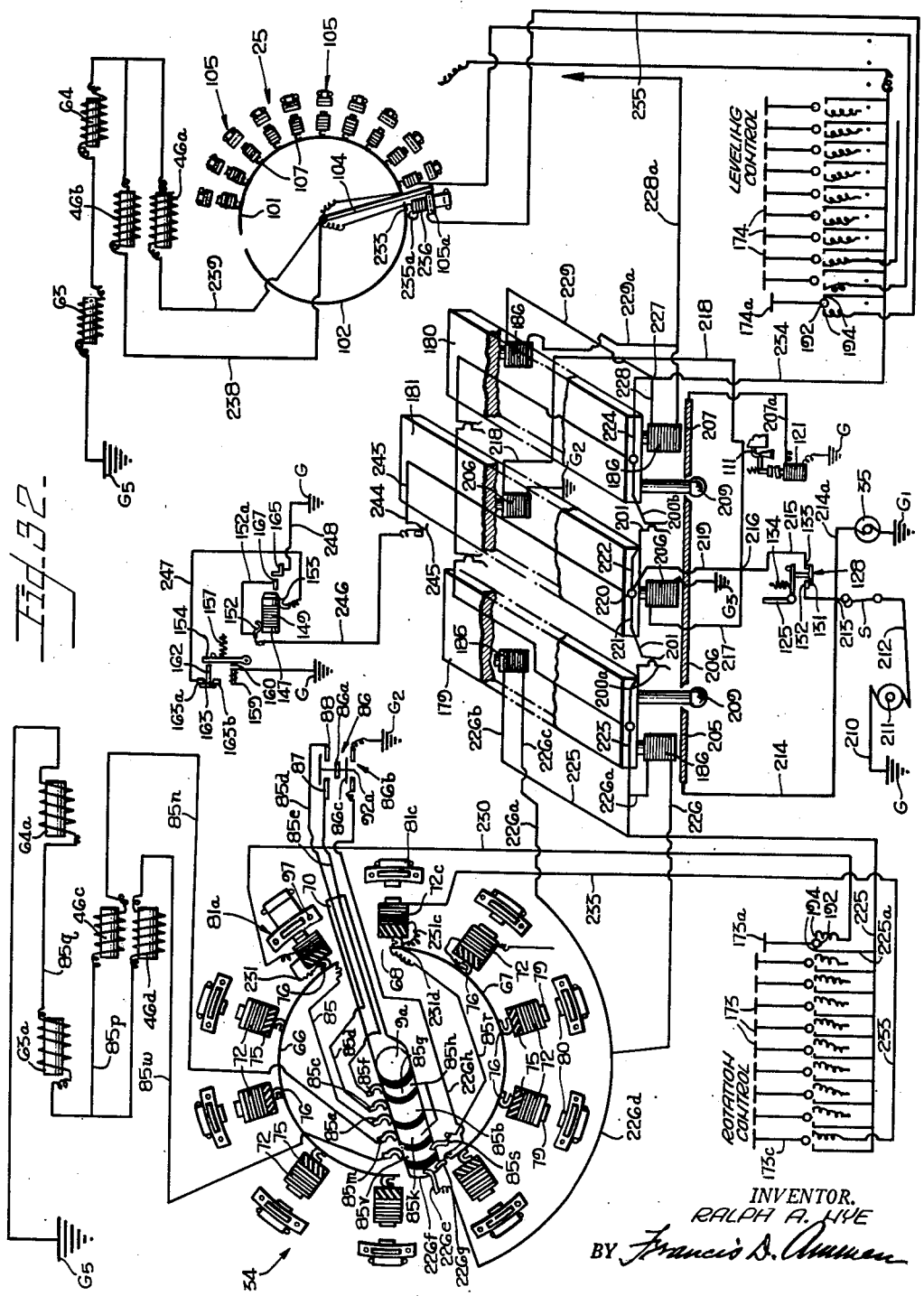

United States Patent Office 2,705,181
Patented Mar. 29, 1955

2,705,181

AUTOMATIC DELIVERY AND FILING APPARATUS

Ralph A. Nye, Los Angeles, Calif.

Application March 3, 1949, Serial No. 79,451

24 Claims. (Cl. 312—223)

This invention relates to mechanism, the function of which is to provide means for storing articles of any kind, or kinds, in a holder, and involves mechanism associated with such means, and cooperating therewith to effect the automatic delivery of any article in the holder, at a location or station upon the operation of selective control means, for example, by the depressing of keys on a keyboard.

There are many situations in which such a delivery and filing mechanism can be employed to advantage, for example, in the filing and storage of data sheets or records relating to the operation of any great activity. Many such activities suggest themselves, such as the keeping of records of the movements of freight cars or trucks; filing and storing data cards or sheets concerned with inventories; or in fact, in any activity where it is required to bring data immediately and automatically to the hand of an attendant or operator, effected through the operation of simple hand operated control means.

In other words, an object of this invention is to provide a holder in which a plurality of articles can be methodically stored in orderly arrangement, and to provide simple manually controlled means for delivering any one of the stored articles to the attendant. By this means any desired article regardless of where it is filed in a multiple holder, can be delivered to the operator of the apparatus in a second, by actuating the proper control members.

Another object of the invention is to employ the principle of storage with reference to an axis of rotation; and with reference to height or level of the stored articles as compared with the level of the attendant's desk where the article is to be delivered.

In carrying out my purposes it has been one of my objects to provide selective direction control means as regards the rotation about an axis that will operate to employ the minimum amount of rotation of any given article that is necessary to present it in position before the operator or attendant.

Another object of the invention is to provide means capable of operating in such way that the two movements referred to: rotation about an axis, and the advancing of the article to the level of the operator can be made to occur simultaneously. This feature of the invention minimizes the lapse of time required for effecting the delivery of any given article.

In the preferred embodiment of this invention it includes a shelf or table before which the operator of the apparatus may sit; and one of the objects of the invention is to provide the apparatus with means for automatically delivering the required article on the table before the operator, and without necessitating the actuation of any controls in addition to those that were required to bring the article into position before the operator.

Another object of the invention is to provide mechanism of this kind, operating in such a way that the mechanism that supports and advances the article, does not have to return to any neutral position or normal position of rest after effecting the delivery of any article. In other words, the elements of the invention can effect the delivery of any desired article from any position it may have had prior to, or at the moment of delivery of the article. This is another time-saving feature of the invention.

Further objects of the invention will appear hereinafter.

The invention consists in the novel parts and combinations of parts to be described hereinafter, all of which contribute to produce an efficient automatic delivery and filing apparatus.

A preferred embodiment of the invention is described in the following specification, while the broad scope of the invention is pointed out in the appended claims.

In the drawings:

Fig. 1 is a plan of an apparatus embodying my invention.

Fig. 2 is a front elevation of the apparatus illustrated in Fig. 1, the middle portion of the casing being broken away.

Fig. 3 is a vertical section through the casing of the apparatus about on its vertical axis. In this view the casing of the holder for the articles is shown broken away and partially in section.

Fig. 4 is a plan of the casing of the apparatus, a portion of which is broken away and shown partially in section to illustrate details of the arrangement of the cells or pockets for the articles.

Fig. 5 is a vertical section taken on the line 5—5 of Fig. 3, illustrating the swiveled nut that assists in moving the holder to a required level. This is a fragmentary view and omits parts other than those illustrated.

Fig. 6 is a plan of the swivel nut illustrated in Fig. 5.

Fig. 7 is a plan of the keyboard the keys of which control the movements of the delivering mechanism, certain portions of the parts being broken away.

Fig. 8 is a vertical section taken on the line 8—8 of Fig. 7. This view shows a "rotation" key and a "leveling" key in their locked condition.

Fig. 9 is a vertical section taken in the plane of the line 9—9 of Fig. 7, but showing the locking panel in its depressed position in which it permits actuation of the keys, and this view indicates the position of the head of a key that has been depressed, in dotted lines.

Fig. 10 is a vertical cross-section taken about on the line 10—10 of Fig. 7, and particularly illustrating the contacts employed in closing circuits when the two key locking panels are elevated, and also the intermediate panel located between the same. In this view the upper portion of the casing is broken away.

Fig. 11 is a view similar to Fig. 10, but showing the relation of the contacts illustrated in Fig. 10 when all three of the panels mentioned in the description of Fig. 10 are in their depressed position.

Fig. 12 is a view similar to Figs. 10 and 11, but showing another relation of the contacts in which the locking panel for the leveling keys is in its depressed condition while the contact controlled by the locking panel for the "rotation" keys is in its elevated position.

Fig. 13 is a section similar to Figs. 11 and 12, but illustrating a condition of the apparatus in which the two key-locking panels are in their elevated positions, but before the intermediate panel has been restored to its elevated position.

Fig. 14 is a section taken about on the line 10—10 of Fig. 7, and illustrating a contact for the locking panel for the rotation keys, in its depressed position, and also the corresponding contact for the intermediate panel when held down by its electromagnets so that the contacts of these two panels are in engagement with each other.

Fig. 15 is a view similar to Fig. 14, but illustrating the contact of the intermediate panel in the position which it has when the intermediate panel is in its raised position.

Fig. 16 is a view similar to Figs. 14 and 15, but showing the relation of the contacts illustrated in Figs. 14 and 15 when the locking panel for the "rotation" keys is elevated, and also the intermediate panel.

Fig. 17 is a horizontal section taken on the line 17—17 of Fig. 3, illustrating details of a direction selector that functions to determine the direction of rotation about an axis through the smallest angle to effect the delivery of the article. This view is diagrammatic in character.

Fig. 18 is a vertical section taken about on the line 18—18 of Fig. 17, and further illustrating the construction of the direction selector illustrated in Fig. 17.

Fig. 19 is a fragmentary section taken about on the line 19—19 of Fig. 17, and further illustrating details of the direction selector.

Fig. 20 is a vertical section taken about on the line 20—20 of Fig. 17, further illustrating details of a switch carried on the end of the sweep or arm through the end of which this section is taken.

Fig. 21 is an enlarged detailed view of a gear assembly cooperating with the mechanism shown in Fig. 17 for establishing a drive in the proper direction to effect the rotation about the axis around which deliveries of the articles are made; in this view certain parts are broken away.

Fig. 22 is a vertical section taken about on the line 22—22 of Fig. 2, particularly illustrating details of the apparatus at the point where delivery of the article onto the operator's table is effected. This view is of course upon an enlarged scale relative to Fig. 2.

Fig. 23 is a fragmentary view and is a substantially horizontal section taken about in the plane of the line 23—23 of Fig. 22. In this view certain parts are broken away.

Fig. 24 is a vertical section through a switch shown in Fig. 22, which is controlled by a trigger activated by the article when it is delivered onto the operator's table.

Fig. 25 is a horizontal section taken about on the line 25—25 of Figs. 3, 26, illustrating more or less digrammatically the direction selecting apparatus for leveling the delivered article to the level of the operator's table. This view, of course, is upon an enlarged scale as compared with Fig. 3, and is diagrammatic in its nature.

Fig. 26 is a vertical section taken about on the line 26—26 of Fig. 25, and further illustrating details of this particular feature of the apparatus.

Fig. 27 is a vertical section taken about on the line 27—27 of Fig. 3 but upon an enlarged scale, and particularly illustrating brake mechanism which is automatically released when a rotary delivery movement starts and automatically applied to determine the extent of the rotary delivery movement.

Fig. 28 is a vertical section taken about on the line 28—28 of Fig. 29. This view illustrates automatic mechanism for moving a platen through one line space, which platen may be associated with the other apparatus for facilitating the making of entries on cards, or placing other data on the delivered article before returning the same to the file.

Fig. 29 is a fragmentary view broken away and is an ideal section taken about on the line 29—29 of Fig. 28. This view illustrates details of a clutch for connecting up a drive to the platen, and an automatic switch that closes a circuit when the clutch is closed.

Fig. 30 is a fragmentary view in the nature of a perspective, that illustrates the platen and the sheet of paper on the platen carrying tabulated figures that may be used in connection with the making of records of the filed articles.

Fig. 31 is also a fragmentary view, and is in the nature of a front elevation of the sheet shown in Fig. 30, and further illustrating how this sheet and the numbers on it may be used in connection with the filing away of data in the apparatus.

Fig. 32 is a diagrammatic view illustrating all of the elements of the apparatus, and showing the type of electric wiring that may be used in connection with this apparatus.

In Figs. 1 and 2 I illustrate an apparatus by way of example, embodying my invention, and in the present instance this apparatus includes a substantially cylindrical casing 1 provided at its forward side with an opening 2 through which deliveries of articles from the interior of the casing may be effected. At the front of the apparatus a table 3 is provided before which the operator of the apparatus sits at his receiving station.

Within the casing 1 I provide a support comprising a holder 4 that in the present instance, is in the form of a circular or polygonal cabinet provided with a plurality of pigeon holes 5 (see Fig. 4) that are disposed in vertical tiers as indicated at the portion of the holder that is illustrated in section in Fig. 3. The pigeon holes in each tier are separated from each other by bottom walls 6 which are preferably inclined at a slight angle to the horizontal so that a small tray 7 in each pigeon hole can slide out by gravity supplemented if desired by a spring, when it is automatically released as will be described hereinafter. In order to facilitate this, the bottom walls are provided with small rollers 8 on which the bottoms of the trays rest. The holder 4 has a central shaft 9 the lower end of which is stepped in a step bearing 10 which may be located at the floor level which is indicated by the line 11. The holder 4 is guided on the shaft 9, but is non-rotatable with respect to it, and above the holder a threaded sleeve 11 is provided that is loose on the shaft 9, but which has at its lower end a swivel connection 12 to the upper head 13 of the holder. At the upper end of the threaded sleeve 11 a sleeve or collar 14 is attached to it, and this collar has counter-weights 15 connected to it by flexible cords or cables 16 which support the weight of the holder and all the parts connected directly therewith. The holder, however, is not actually "floating" because on the threads of the sleeve 11 there is a nut 17 which is threaded to cooperate with the threads on the exterior of the sleeve 11. This thread should be a relatively high pitch thread. The rotation of this nut 17 in one direction or the other, will cause the holder 4 to rise or fall an amount determined by the leveling key on the keyboard that happens to be depressed. This keyboard and the operation of its keys will be described at another point in this specification. At this time, it suffices to say that the nut 17 is rigid with a large bevel gear 18 which can be rotated in either direction by a bevel pinion 19, said bevel pinion being carried rigidly on a drive shaft 20 which is itself driven by a bevel gear 21 on its outer end, that is in constant mesh with two bevel gears 22 and 23.

Between these bevel gears 22 and 23 a direction selective clutch 24 is provided, which clutch is shown in detail in Fig. 21, and which is electrically controlled through the agency of a direction selector 25 (see Fig. 3) which is provided with a plurality of control switches. For simplicity and brevity in referring to this direction selector, I call it a "timer." Its details will be described presently. It includes a vertical shaft 26, to the upper end of which an arm is attached, and the direction of movement of this arm through the control of the switches in this device, determines in what direction the nut 17 will be rotated; the extent to which this rotation of the nut is determined by the particular "leveling" key on the keyboard that is struck to bring a certain tray to the level of the opening 2 at the front of the casing 1.

The nut 17 is normally held against rotation by means of an automatic brake device 27 such as that illustrated in detail in Fig. 27. This brake and a similar brake device that is employed for holding the shaft 9 normally in a fixed position, will be described hereinafter. It suffices at this time to say that this brake device is practically constructed so that it is held applied by springs and provided with electromagnetic means for releasing the brake when the proper circuit through the electromagnetic device is closed.

The shaft 9 has an upper extension 9a coaxial with it, and keyed to the upper portion of this shaft 9a I provide a large bevel gear 28, which gear is driven in either direction by a pinion 29 carried on a drive shaft 30, which drive shaft is provided with an automatic brake 31 similar to the automatic brake 27. Furthermore, the shaft 30, like the shaft 20, is driven in either direction through a direction selecting clutch 32 similar to the clutch 24.

At the upper end of the shaft 9a and just below the upper head 33 of the casing 1, I provide a rotary timer or direction selector 34 that determines automatically the proper direction of rotation of the shaft 9a and shaft 9 to bring the desired pigeon hole 5 with its tray 7 through the shortest angle to align it vertically with the opening 2.

A motor, preferably an electric motor 35 is provided, which is mounted with its axis in a vertical position by means of a bracket 36 secured to the inner face of the wall of the casing 1. This motor drives a coaxial shaft 37 that extends down to a point near the intermediate head 38 within the casing that supports the nut 17 and the other mechanism already described, which is associated with it, and near the bevel gear 22 already described, a bearing bracket 42 is mounted to provide a bearing for the lower portion of this shaft.

The motor 35 also has a coaxial shaft 40 that extends upwardly through an upper false head 41 that supports the bevel gear 28 and the brake device 31 already referred to, and above this false head it carries the direction selecting clutch 32.

The two direction selecting clutches 24 and 32 may be identical in construction, and I prefer to construct them substantially as illustrated in Fig. 21. The clutch illustrated may be for example, the clutch 24 that drives the shaft 20 for effecting the leveling operation to raise or lower the holder 4 to correspond with the particular leveling key as will be described hereinafter. In this view the upper bevel gear 22 is shown in cross-section. The two gears 22 and 23 are identical in construction, and each is constructed so as to enable it to operate as a clutch member to co-operate with its corresponding clutch member 22a and 23a. In this view a clutch composed of the two clutch members 23 and 23a is represented as closed. The two clutch members 22a and 23a are splined on the shaft 39 that extends continuously through both clutch members down to the step bearing 42 that is provided on the intermediate head 38 to support the lower end of this shaft.

Any suitable type of clutching means may be employed to cooperate with the bevel gears 22 and 23, but I prefer to employ friction clutches at these points, and in the present instance, I have illustrated each of the bevel gears 22 and 23 as provided with a conical socket 43 to cooperate with the conical face 44 of its corresponding clutch member. Each of these conical clutch members is provided with a metallic part 45 that operates as an armature for an electric coil 46a or 46b. The portions of the parts 45 that are disposed toward the coils 46a and 46b are polarized oppositely to the magnetic pole that will be developed by current flowing in the corresponding coil 46a. In other words, these parts are constructed and disposed so that when current flows in the coil 46b the part 45 will be repelled by the magnetic forces so that it will move upwardly and close the clutch 22—22a. Likewise, when current flows in the coil 46a the clutch composed of the members 23 and 23a will become closed. These coils 46a and 46b are of course wound on insulating core sleeves 46 that are of sufficiently large diameter to fit loosely over the shaft 39. The adjacent ends of the coils are secured to a circular head 47 formed at the inner end of the bracket arm 48, the outer end of which is secured to the inner side of the wall of the casing 1 (see Fig. 3).

As already stated, the construction of the upper direction clutch 32 is the same as that of the clutch. 24. However, in this case the shaft of the uppermost bevel gear of the combination is carried on a shaft mounted in a bracket 49 that is attached to the under side of the upper head 33 of the casing 1.

The brake devices 27 and 31 are substantially identical in construction. The brake device 27 is illustrated in detail in Fig. 27. This construction includes a casing 50 having a substantially semicircular dome 51 at its upper portion, and having a box-form bottom portion 52 with a bottom wall 53 to which a brake band 54 is anchored by means of a threaded stem 55 with an upper nut 56 and a lower nut 57 that operate to clamp the stem 55 to the base and at the opening in the base through which the stem passes. The brake band is disposed around a brake drum 58 keyed on the shaft 20. This brake band is formed with a gap 59 between its ends which are bent outwardly to form ears 60 to the inner faces of which a coil tension spring is attached, which normally holds the brake band against the face of the drum. The outer sides of the ears 59 are provided with armatures 62 to cooperate with electromagnets 63 and 64, respectively, the cores of which will attract the armature 62 whenever the coils 63 and 64 are energized. In other words, normally these brake devices 27 and 31 are in a condition to hold the shafts 20 and 30 against rotation.

Referring now to Figs. 17 to 20, inclusive, which illustrate the details of the timer or direction selecting switch 34 (see Fig. 3) the function of which is to determine the direction that the shaft 9 will be rotated when a certain "rotation" key is depressed. These keys controlling rotation, are illustrated in the top row of keys in Fig. 7. It may be stated at this time that the lower row of keys are "leveling" keys, that is to say, they control the lifting and depressing of the holder 4 to bring the required pigeon hole 5 to the level of the opening 2 in the casing.

As illustrated in Figs. 17 and 18, the upper end of the shaft 9a carries a circular head 65 of insulating material, and the periphery of this head is provided with two conductor segments 66 and 67 the ends of which are separated so as to form two diametrically opposite gaps at which insulation strips 68 and 69 are provided, the outer faces of which have the same radius as the outer faces of the conductor segments 66 and 67, so that their outward faces are flush with those of the segments.

The extension shaft 9a extends up above the insulating head 65 and carries a radial arm 70 which is keyed to it by a key 71 (see Fig. 18). This arm 70 is located immediately over one of the insulation strips 68.

Disposed circumferentially equidistant from each other around the peripheries of the conductor strips 66 and 67, I provide a plurality of electromagnets 72 which are mounted on brackets 73 (see Fig. 18) that are secured to the bottom 74 of the casing of this instrument. Each of these electromagnets has an insulating head 75 at its inner end, and each of them is disposed with its axis in a substantially radial position. Each insulating head carries an insulated spring contact 76 the inner portion of which in a radial direction, acts as a wiper always in contact with either one of the strips 66 and 67, or the insulation 68 and 69 that separates the same. The coils of these electromagnets 72 and their corresponding contacts 76 are wired in series through lead-in wires 77 and 78. Each electromagnet 72 includes a core 79 the outer end of which is capable of attracting an armature 80 carried on the inner face of a stop device. These stop devices are indicated generally by the reference numeral 81, and there are the same number of stop devices as there are magnets. Each stop device is in the form of a sector as viewed in plan, and the lower end of each sector is cut down to form a tongue 82 that is pivotally mounted on a horizontal pivot pin 83 in a forked bracket 84. This construction is illustrated in detail at the left side of Fig. 18 where one of these stop devices is shown in its inactive position. At the right side of this view one of these stop devices 81 is shown in its active position. In other words, its corresponding electromagnet 72 is supposed to be energized so as to draw the stop device 81 up into an upright position.

Each of these stop devices 81 corresponds to a certain rotation key, for example, as illustrated in Fig. 17, the stop device 81a that is nearest to the arm 70, corresponds to the zero key of the rotation keys in the upper row of Fig. 7. The adjacent stop device 81b next above the stop device 81a, corresponds to the key "Number 1" of the rotation keys in the top row of Fig. 7, the next stop device above that is indicated by the reference numeral 81c and corresponds to the "Number 2" key of that line, and so on around the entire periphery of this instrument.

Assuming now that the zero key at the left end of the rotation line of keys in Fig. 7 has been depressed, it will close a circuit through the electromagnet 72 corresponding to the stop device 81a, and this will pull this stop device upwardly to the position in which it is shown in Fig. 17. It will also close a circuit through the corresponding contact 76 and through the segment 66. This segment is connected to a conductor or wire 85 which connects up to other conductors to be described hereinafter, that will operate to close a circuit through the coils 63 and 64 of the brake device 31 (which has the same internal construction as the brake device 27. See Fig. 27). This will release the brake on the shaft 30, and will also close a circuit through either one of the coils 46a and 46b of the direction-controlled clutch 32 to effect the rotation of the shaft 30 in the proper direction. In other words, one of the conductor segments 66 and 67 is wired to one of the coils 46a or 46b, and the other segment to the other one of these coils. This wiring will be described more in detail in connection with the description of Fig. 32 in which the complete wiring of the apparatus is illustrated. Suffice it to say at this point, that the release of the brake on the shaft 30 and the closing of the proper one of the clutches having the clutch members 22a and 23a, will rotate the shaft 30 in the proper direction, and this will cause rotation of the shaft 9a and 9 in an anti-clockwise direction as indicated by the arrow near the arm 70 in Fig. 17.

It should be stated at this time, however, that the motor 35 is continuously running when the apparatus is in operation.

The under side of the arm 70 is provided with means to cooperate with the stop device 81a to arrest the rotation of the shaft 30 when the arm 70 arrives over the stop device 81a. This is accomplished through the agency of a switch 86a illustrated in Fig. 20. Any suitable switch can be used at this point, that is constructed so that it will open when the arm 70 moves up over the stop device 81a (or any other stop device) which has been put up in a set position by the energizing of its corresponding electromagnet. In the present instance, as illustrated in Fig. 20, this switch includes two insulated contacts 87 and 88 which are normally bridged by a contact 89. This contact 89 has a stem 90 that is guided through an insulating plate 91, and its lower end has a rounded tip 92 that projects down below the insulating bottom wall 93 of the box 94 for this switch. A coil spring 95 disposed around the stem 90 and thrusting at its lower end against the collar 96 on the stem, normally holds the bridge contact 89 firmly against the fixed contacts 87 and 88, and of course also holds the tip 92 projecting below the bottom wall 93. Now, when the switch-box 94 arrives over the stop device 81a, it rides up on a rounded button 97 that projects up from the upper face of the stop device 81a. This will push the pin 90 upwardly and raise the bridge contact 89 to open the circuit that has been established through the contacts 87 and 88 by means that will be later described. This button 97 is shown clearly at the left of Fig. 18, and all of the buttons on these stop devices are clearly shown in Fig. 17. It will be noted that there are two buttons 97 on each stop device. One of them corresponds to one direction of approach of the arm 70, and the other to the opposite direction of approach. In order to overcome the inertia of the moving parts connected with the arm 70 and the head, I provide a sector-shaped upwardly projecting brake 98 on the upper face of each stop device, and these brake strips 98 function to arrest the rotary movement of the arm, and they also operate to keep the circuit open.

Each of the tongues 82 is connected below the pivot pin 83 to a coil compression spring 99 the outer end of which thrusts against the side wall of the casing of this instrument as shown in Fig. 18. Fig. 19 shows a detail of this spring and its connections at its ends with the stop device in its active upright position.

In Figs. 25 and 26 I illustrate schematically the details of the timer or direction selector 25. This instrument 25 of course operates to determine the direction of degree of rotation of the nut 17 to effect the leveling of the desired tray to the height of the opening 2 in the casing. The construction of the working parts of this instrument 25 are the same as those of the timer 34 just described, except that the stop devices are not disposed equidistant around the entire circumference about the axis of the instrument, but are all disposed within an angle of 160° about the axis. However, the instrument includes a circular head 100 of insulating material the circumference of which is provided with two conductor segments 101 and 102 the ends of which are separated by relatively smaller gaps which are filled with insulating strips such as the strip 103 the outer faces of which are flush with the outer faces of the conductor segments or sectors. The head 100 is keyed to the shaft 26, and above the head 100 the shaft carries an arm 104 that corresponds to the arm 70 described in connection with Fig. 17. The instrument includes a plurality of stop devices 105 mounted like the stop devices 81 and cooperating in the same way with electromagnets 106 that correspond, respectively, to the keys of the leveling row, that is, the lower row shown in Fig. 7.

The construction also includes spring contacts 107 carried on the insulating inner heads of the electromagnet coils, which constantly make contact with either the conductor sector 101 or 102. The arm 104 is disposed in alignment with one of the gaps between the conductor sectors as the corresponding arm is disposed as illustrated in Fig. 17. The arm 104 also carries a switch-box 108 (see Fig. 26) that carries a switch within it corresponding to the switch 86a shown in Fig. 20. In Fig. 26 this switch-box is illustrated in a position so that the tip 109 of the stem of its bridging contact that functions like the bridging contact 89 in Fig. 20, is in engagement with a button 110 that corresponds to the buttons 97 on the previously described stop members 81. In Fig. 25 one of the stop members indicated specifically by the reference numeral 105a, is illustrated in its active position in which it has been pulled up to an erect position so that when the arm 104 moves over toward it, its button 110 will engage the tip 109 and open up the circuit that is controlled by this switch.

It should be understood also, that the wiring for this instrument is a duplication of the wiring of the timer or direction selector illustrated in Fig. 17.

Referring to Figs. 22 to 24, inclusive, when a pigeon hole 5 is brought into alignment with the opening 2 in the casing, by reason of the fact that the bottom of each pigeon hole is inclined downwardly toward the perimeter of the holder, the tray 7 would roll out automatically. However, it is prevented from doing so by a latch 111 (see Fig. 23). This latch is pivotally mounted at 112 on a bracket 113 that is secured to the inner face of the peripheral wall 114 of the holder 4. This latch 111 has a finger that normally projects into a socket 115 in the side wall 116 of the tray. The latch is biased in this direction by a small coil spring 117 that normally holds an arm 118 of this latch, up against a stop pin 119.

The arm 118 has a horizontal extension 120 that projects toward the operator's position, and the end of this extension carries an armature to cooperate with the core of an electromagnet 121 carried on a bracket 122. When the required tray 7 arrives at the opening 2, the energizing of the electromagnet 121 rocks the latch 111 in an anti-clockwise direction, which withdraws it from the socket 115. This permits the tray which is preferably supported on rollers 8 in an elevated false bottom 124, to roll down and out of the opening 2.

As the tray 7 rolls out, it passes over an upwardly projecting trigger 125 that extends up through a slot 126 in the forward edge of the table 3. The trigger 125 is pivotally mounted as indicated, on a bracket 127, and functions to operate a switch 128 (see Fig. 24). Any suitable means may be employed to accomplish this, but in the present illustration, the trigger 125 has an arm 129 that impinges against an insulating head 130 connected to a bridge contact 131 that bridges two fixed insulated contacts 132 and 133. The bridge contact 131 is normally held in a position to close the circuit through the contacts 132 and 133, by means of a small spring 134. So, when the tray runs over the trigger 125 the circuit through the contacts 132 and 133 will be broken. The breaking of this circuit has certain effects that will be described in detail in connection with Fig. 32.

Referring again to the trigger 125 and to Fig. 22, a small coil spring 135 is provided, that normally holds the arm 129 of the trigger up against a stop 136.

When the tray 7 is on the tray-seat 3a of the table 3 (see Fig. 1) its bottom is still in contact with the upper end of the trigger 125, holding the same in a position in which it is swung toward the right as viewed in Fig. 22. This maintains the end of the arm 129 against the ball 130; when the tray is pushed back into its pigeon hole, it compresses a coil spring 137 in the back of the pocket, and as soon as the latch 111 falls into its socket 115, the tray will be held latched in its pigeon hole or pocket 5. As the return spring 135 pulls the trigger 125 back to its normal position, the switch 128 becomes closed by the spring 134 that pushes the bridge contact 131 up into position against the under sides of the contacts 132 and 133. The opening of these circuits through the contacts 132 and 133 affects the apparatus so as to set a tally circuit that controls the operation of a record sheet which the operator of the apparatus may use if desired, in placing data inside the tray. Such a tally sheet indicated by the reference numeral 138, is indicated in Figs. 30 and 31. This sheet is wrapped upon a cylindrical platen 139, the shaft 140 of which is supported at its ends in suitable bearings 141 and 142 (see Fig. 29). Now, when the circuit through the contacts 132 and 133 is closed again, it automatically operates the platen 139 to rotate it through one line space so that lines such as the two lines 143, will come up into view in succession. The sheet 138 is held against the face of the platen by suitable arc-shape clips 144 carrying presser rollers 145, respectively, constructed and operating in a well understood manner. In other words, the platen construction and the means for holding the presser rollers 145, is such as is employed in regular typewriter practice. However, in accordance with my invention, I provide one end of the platen 139 with a clutch member 146 (see Fig. 29) to cooperate with another clutch member 147. These clutch members have cooperating conical faces such as illustrated in Fig. 29. The clutch member 147 is free to slide on the shaft 140, being connected to it by a spline 148. In addition to this, the rear part of the clutch member 147 carries an electric coil 149, the ends of which are connected to two contact bands 150 and 151. Fixed insulated brushes or spring contacts 152 and 153 are provided, that maintain contact with the contact bands 150 and 151 at all times.

In order to enable the rocking movement of the arm 154 to rotate the platen with a step by step movement only in the forward direction, I provide a ratchet wheel 139b on the platen cooperating with a detent pawl 139a that is pressed against the teeth of the ratchet wheel by a spring 139c.

The head 146 of the platen that operates as a clutch member, is of magnetic metal, so when the circuit is closed through the coil 149, the clutch member 147 becomes magnetized, and through the agency of its magnetism it draws itself over against the clutch member 146, thereby closing the clutch. After that occurs, or as that occurs, the clutch member 147 is given a rotation through an angle sufficient to impart a line-to-line advance movement of the tally sheet 138. In connection with the operation of this clutch, it should be stated that in Fig. 29, for the sake of clearness, the two clutch members have been illustrated a considerable distance apart. In practice, however, the distance between these clutch members should be very slight, so that as soon as the circuit is closed through the coil, the clutch will close. If a quick closing effect is attained between the clutch members 146 and 147, it may be possible to employ the same circuit to effect the line-to-line movement of the platen. However, I prefer to have the movement of the clutch member 147 toward the clutch member 146 establish another circuit or branch circuit through mechanism for giving the shaft 140 of the platen a movement through a small angle to give the line-to-line movement of the platen. Mechanism for this purpose is illustrated in Fig. 28, and includes an arm 154 which is keyed to the shaft 140, and this arm is provided with an adjustable stop 155 that is normally held against a rest face 156 by a coil spring 157 attached to the arm. Located in the path of movement of the arm when it moves to give advancing rotation to the platen, I provide a bracket 158 in the forward end of which an electric coil 159 is mounted, the core of which projects outwardly and adjacent to an armature 160 carried by the adjacent face of the arm 154. When a circuit is closed through this coil, the core of this coil 159 attracts the armature 160 and pulls the arm 154 toward the left in an anti-clockwise movement, as viewed in Fig. 28. As the clutch composed of the clutch members 146 and 147 is closed when this occurs, this movement will be imparted to the platen.

As this movement is about to terminate, the tip of adjusting screw 161 strikes the tip of a stem 162, which stem carries a bridge contact 163 and breaks the circuit that energizes the coil 159. This circuit referred to, includes a switch 164 composed of a contact 165 on the platen (see Fig. 29) and an insulated contact stem 166 having a head 167 that impinges upon the contact 165 when the clutch member 147 moves over against the clutch member 146. In this way, the actuating circuit for the arm 154 of the rotary feed movement of the platen closes. A coil spring 168 normally holds the stem 166 in an extreme position and against an insulating ring 169 on the adjacent end of the clutch member 147.

Referring again to the lines 143 that contain tally numbers, I have used the first two digits of each line to indicate to the operator of this apparatus, the numbers of the two keys that are to be operated on the keyboard to bring the desired tray to the operator's table. However, this is a matter that should be adapted to the requirements. The two last digits could be used as well. For this purpose the tally sheet 138 is preferably provided with two vertical columns 170 (see Fig. 31). For example, the column at the left may carry a digit that indicates the number key in the "rotation" line that is to be depressed while the other column at the right may carry a digit or character to indicate the number key that is to be depressed to effect the leveling operation for the holder.

It should be understood that the platen shaft 140 should be friction-tight in its bearings. Any suitable means may be employed to accomplish this. For example, between the hand-wheel 171 and the bearing bracket 142, a spring washer 172 may be placed. By inserting the tally sheet 138 between the platen 139 and the small presser roller near it (see Fig. 30) and rotating the platen by means of its hand wheel 171, the tally sheet can be advanced far enough to enable the top line of the numbers N on it to be read; after which the automatic tally sheet feed mechanism described above operates to rotate the platen periodically to bring the second number up to reading position, and so on.

Referring now particularly to Figs. 7 to 16, illustrating the keyboard and details of the keys and keyboard construction, and also referring to Fig. 32 which is a diagrammatic illustration of the wiring system, it will be noted that the keys are disposed in two rows which have already been referred to. The upper row of keys illustrated in Fig. 7 have already been referred to as "rotation" keys. There may be any number of these rotation keys, but for the purpose of illustration and by way of example, I have illustrated merely a keyboard that is supposed to carry ten keys numbered from zero to 9 in sequence, and corresponding to a holder unit such as the unit 4 illustrated in Fig. 3, having ten radially disposed vertical rows or tiers of pigeon holes 5 arranged equidistant from each other as indicated in Fig. 4. Each of the vertical tiers of pigeon holes corresponds to a certain key in the upper row. These keys are indicated collectively by the reference numeral 173.

As indicated in Fig. 3, there are ten pigeon holes 5 in each vertical tier, and the keys 174 in the lower row control the raising and lowering of the holder 4 to bring any required pigeon hole to the level of the opening or doorway 2 in the front wall of the casing 1. The other keys 173 of course, as already explained, control the orientation of the holder to bring the proper tier of pigeon holes into a position opposite to the opening 2. As indicated in Figs. 8 and 9, all of the keys have stems 175 that are guided through two guide plates 176 and 177 which are disposed horizontally in a keyboard-box 178.

Each row of keys has a corresponding locking panel. For the upper row there is a locking panel 179, the lower edge of which as illustrated in Fig. 7, projects under the heads of the keys 173; and there also is a locking panel 180 on the other side of the box 178, one edge of which projects under the heads of the keys 174 in the lower row. There is also an intermediate panel 181, which is in a sense, independent of the keys, but which cooperates with contacts on the other two panels as will be described hereinafter.

In Figs. 7 and 8 the means for controlling the operation of these panels is illustrated, and this means is the same for both the panels 179 and 180. At the end of each panel a guide stem 182 is provided, which is rigid with the panel and extends downwardly from its under side. Each of these stems is guided through a guide plate 183 and has a head 184 at its lower end, that lies in a socket in a horizontal stop plate 185 that is held fixed within the box 178. In addition to this, adjacent the end of each of these panels an electromagnet 186 is provided, the core of which is capable of attracting an armature 187 carried by the under side of each panel. The intermediate panel 181 is also provided with armatures like the armature 187, which cooperate with electromagnets 186 under each end of the intermediate panel. In addition to this, coil springs 188 are provided at both ends of each panel, and which are capable of holding the panels in the elevated position in which they are shown in Fig. 8. At other times the panels may be held in a depressed position as illustrated in Fig. 9, at which time the springs 188 will be in a state of compression while the armatures 187 are held down by the electromagnets. Below the upper guide panel 176 each key stem is provided with a contact which, as illustrated, is in the form of a ball 192, and when any key is depressed, this ball moves down and moves into a socket 193 between two spring contacts 194. This enables the head 192 to operate as a bridge contact between the spring contacts 194. These contacts are of course, insulated from each other by the guide panels 176 and 177 which are of insulating material.

Each key is provided with a return spring 195 that thrusts at its upper end against a collar 196 fixed to the stem of the key to hold the keys in their normal elevated position.

Each of the panels 179 and 180 is provided with a contact head 197 that is carried rigidly on a stem 198 rigid with the panels. Each contact head is insulated by an insulating collar 199 (see Fig. 11). On their adjacent sides the contact heads 197 are provided with contacts 200a and 200b. These contacts cooperate with similar contacts 201 that project from the opposite sides of a contact head 202, that is carried on a similar stem 203 (see Fig. 15), rigidly attached to the under side of the intermediate panel 181. The contact head 202 is carried on its stem on insulation 204. In Fig. 14 the contact head 202 is illustrated as held down in its depressed position by its corresponding electric coil 186, and in this view the contact head 197 is also shown in its depressed position, with the contacts 200a and 201 in engagement with each other. In Fig. 16 both the contact head 202 and the contact head 197 are in their elevated position and with their contacts touching. These relative positions of these contact heads correspond to different circuits, as will be explained later.

Referring now to Fig. 32 which is of a diagrammatic nature particularly illustrating the wiring of the complete apparatus, it should be understood that the wiring associated with the keys would be extremely complicated and require a considerable amount of unnecessary lines if the connection from each key was illustrated. In this diagram, it should be understood, that the rotation timer or direction selector 34 is illustrated at the left of the view, while the leveling timer or direction selector 25 is illustrated at the right of this view. At the left lower portion of the figure the rotation keys 173 are shown in a row, while at the right lower portion of the view the leveling keys 174 of the lower row shown in Fig. 1 are illustrated. As an example, wiring is illustrated complete for one key only, of the rotation keys, and for one leveling key. In the middle portion of Fig. 32, the relation of the key panels 179 and 180 for the keys is illustrated, together with the intermediate panel 181.

As illustrated in Figs. 11 to 13, and Fig. 32, on the bottom of key-box 178, three contact plates 205, 206 and 207 are supported on insulation 208. In the elevated position of the panels 179 and 180 the gaps between these contact plates are bridged by insulated contact heads 209.

The wiring of the circuits and the mode of operation of the apparatus will now be described. For the sake of simplicity the circuits employed are all illustrated as grounded circuits, but in practice of course, if desired, circuits that are all-metallic may be employed, connected into circuit between the terminals of an ordinary commercial electric supply line.

In reading Fig. 32 it should be understood that the panels 179, 180, and 181 are not represented in their normal position. In their normal position all of them are in their elevated position but their contacts are touching as they are shown in Fig. 32.

When main switch S in Fig. 32 is moved to its closed position, "circuit A" is established from the ground G, wire 210 through a source of E. M. F. such as a generator 211, wire 212, junction 213, wire 214a, through motor 35 to ground G'. This keeps the motor 35 running continuously and maintains the apparatus ready for further operation. Closing this switch also energizes the electromagnets 186 under the panel 179, and they pull down the panel 179. This is necessary to enable the keys in "rotation bank" to be depressed. Energizing these magnets is accomplished by establishing the following circuits: From junction 213, switch 131, through wire 215, junction 216, wire 219, junction 220, wire 221, contacts 201 and 200a, wire 223, branch wire 226a, through the near coil 186, and to wire 226, and thence to wire 226d; also through the far coil 186 via wire 225, 226b, returning by wire 226c to wire 226d. Wire 226d leads over to brush 226e riding on contact ring 226f, and from this ring to the brush 226g, and thence by wire 226h to secondary switch 86b, and through the bridge contact 86c of this switch which is normally down, and from the switch to ground G₂. (See Fig. 17.)

Closing switch S also establishes a second circuit through the magnets under panel 180, that is similar to the circuit through secondary switch 86b just described. This goes to arm 104 and to a secondary switch like switch 86b that is associated with its own switch 86a, that is a counterpart of that switch on arm 70, and functions in the same way. The path of this circuit wiring at the keyboard is from intersection 220, wire 222, contacts 200b and 201, and through wire 224 to junction 227, wire 228 through the coil of the near magnet 186, thence by wire 228a up to a slip ring on the shaft 26 of arm 104 that corresponds to slip ring 226f on the shaft 9a. From the slip ring on shaft 26 a circuit that is a counterpart of that in the rotation selector switch passes through its secondary switch 86b and thence to a ground (see ground G₂, Fig. 17). The far magnet 186 is connected up in parallel with the near magnet 186 through wires 229 and 229a, to 228a.

As the control circuits from the "leveling keys" 174 to, and through, the direction leveling switch 25 are the same as those described in connection with the rotation direction switch 34, it is unnecessary to describe them in detail.

Closing the switch S also energizes the electromagnets 296 under the intermediate panel 181. These circuits are as follows: Through the near magnet from intersection 216, wire 217 through the coil to ground G₃; and through the far coil by way of wire 218, through the coil and then to ground G₂.

Pulling down the intermediate panel operates the tally mechanism illustrated in Figs. 28 to 31. This is accomplished through the agency of a contact 244 carried by this panel and supplied with current through wire 243 from junction 220. When contact 244 comes down, it wipes against a fixed spring contact 245 in its path, and through wire 246, through the operating circuit for the tally mechanism (see Figs. 28 to 31 inclusive). This sets the number N indicating what tray must be delivered.

Suppose, for example, the "0" key 173a is depressed as indicated in Fig. 32. When this key is depressed, its contact head 192 passes into socket 193 between contacts 194 (see Fig. 9). This closes the following rotation circuit—"circuit R": from wire 225 through branch wire 225a through the contact head 192 at its contacts 194, through wire 230, and through the coil of electromagnet 72 that corresponds to the "zero" rotation key (see Figs. 17 and 18).

This circuit continues through wire 231 that leads from wire 230, and takes current to brush 76 (see Fig. 17) in contact with contact segment 66 through which the current passes to wire 85 and thence to brush 85a (see Fig. 32), contact ring 85b, brush 85c, wire 85d out on arm 70 through stop switch 86a of dual switch 86 (see Fig. 32) thence back on arm 70 through wire 85e to brush 85f, to contact ring 85g and over bonding wire 85h to contact ring 85k, and then through brush 85m and wire 85n through coil 46c (corresponding to coil 46a), which will close the lower end of direction clutch 32, constructed like clutch 23—23a (see Fig. 21) which will give anti-clockwise rotation to shaft 9a (see Fig. 21); from coil 46c the current passes by wire 85p through coil 63a, wire 85q and coil 64a (see Fig. 27) that release the brake 54; it then passes to ground G₅.

The motor 35 now rotates the shaft 9a and the arm 70 in anti-clockwise direction. This movement continues until the dual switch 86 arrives at the stop device 81a (see Fig. 17) that was drawn in by the electromagnet 72 when the same became energized.

As the arm 70 swings, in its anti-clockwise movement, its switch 86a rides over the stop device 81a; and the tip 92a of the stem 90 rides on ball 97, raising bridge contact 89 that connects contacts 87 and 88 (see Fig. 20). This opens the rotation circuit, "circuit R." Of course, as soon as this rotation circuit is opened, the brake magnets 63a and 64a become de-energized (see Fig. 27) and the tension spring 61 applies the brake 54. As the driving clutch 23, 23a is also opened by breaking this circuit, the brake 54 does not have to overcome the momentum of the motor 35, but only that of the parts of the apparatus that are involved in the rotary movement of the holder in its part of the delivering operation.

If the arm 70 drifts past the button 97, it will ride over the brake strip 98 that projects up just as high as the button 97. So, when the arm 70 stops its swing, the bridge contact 89 will still be held up and the rotation "circuit R" will remain open.

When stem 90 is raised by the button 97, it also opens the magnet holding circuits through the electromagnets 186, by opening switch 86b that is also on the end of arm 70, and uses stem 90 to support its bridge contact 86c. When this occurs, of course panel 179 will be raised by its springs (see Figs. 7 to 10), to its normal position of rest. With this panel in this raised position, it prevents any other rotation key from being actuated.

Now, if a rotation key toward the other end of the rotation row had been depressed, say for example, key 173c, a circuit similar to the "circuit R" just described, would have been established from wire 225 through the key contact head and wire 233 through the coil of electromagnet 72c, wire 231c, segment 67, brush 231d, wire 85r, to its brush 85s on ring 85v and thence through coil 46d of the direction clutch (Fig. 21). This would give a clockwise drive to the selector switch 34 and the holder 1. Energizing magnet 72c would have attracted stop device 81c and set it up for engaging the tip 92 (see Fig. 32) of the switch 86b that functions in a clockwise rotation of the shaft 9a.

While this orienting movement is taking place, the leveling circuit can be closed by depressing any one of the keys 174 of the "level control" bank of keys. This leveling operation can take place before, after, or simultaneously with the angular movement about the axis of the holder 1.

For example, suppose that leveling key 174a, the "zero" key, is depressed, as indicated in Fig. 32. When this is done a circuit is closed by the contact head of this key, which circuit is substantially like the "R circuit," described above, that is, the key's cooperating contacts 194 are bridged so that current passes from junction 227 down wire 234, through contacts 194, then out through a wire 235 to the coil of electromagnet 236 (see Figs. 25, 26, and 32) that corresponds to key 174a, and thence to its brush 233 (Fig. 32) through coil 236. Brush wire 235a takes current to the corresponding brush 233 that is in contact with conductor segment 102.

The elements carried by the arm 104 (see Figs. 25, 26 and 32) and circuits are counterparts of those associated with the arm 70, and all the wiring for it is the same as for the arm 70; it has two normally closed switches like switches 86a and 86b, located on the arm 104 in the same relation as the switches 86a and 86b, and functioning in the same manner when the tip 109 of their stem strikes either one of the stop buttons 110 of any set stop device 105a, to open the circuit through these switches. For practical reasons the sweep of the arm 104 is through only about 160° instead of 360°. (See Fig. 26.) All the stop devices 105 are located in an arc on one side of a diameter of this instrument. They correspond, respectively, to the leveling key 174.

The same character of circuit is established as when an orientation key is depressed, but the control is effected through the agency of panel 180.

When a leveling key 174 is depressed a circuit, I call "circuit L" is established, similar to "circuit R," passing from a set of rings on the shaft 26 of the arm 104 by one or the other of wires 238 or 239 that carry the current through one of the coils 46a or 46b of the direction clutch 22 (see Fig. 3) to impart the proper direction of rotation to the shaft 20 and to the nut 17; this "circuit L" of course also passes through the coils 63 and 64 that release the brake band of brake device 27 to permit shaft 20 to rotate.

The shaft 26 of the switch 25 (see Fig. 3) is driven through gearing 240 including a large bevel gear 241 below shaft 26. This gearing drives the shaft 26 at slow speed through a reduction gear 242 so that the arm 104 will sweep through only 160° while the threaded sleeve 11 is passing its entire length through the nut 18. The swinging of the arm 104 is stopped automatically when the stem of its switch (same as 86a or 86b) shown in Fig. 32, strikes the set-up stop device 105a, automatically applying the brake and opening the clutch at 23. (See Fig. 21.)

When "circuit L" is broken, the desired pocket 5 of the holder 4 will be in alignment with the delivery opening 2 of the casing 1, as it will have been oriented to the required angular alignment by the operation of the rotation key, assuming that the rotation key has been struck.

When both of the panels 179 and 180 rise to their elevated positions, the contact heads 209 carried on their insulated stems, close a delivery circuit, "circuit D" which is as follows: From junction 213 by wire 214 to and through contact strips 205, 206 and 207, through wire 207a, and through release coil 121 (see Fig. 23). This releases latch 111, and permits the tray 7 to descend down its ramp 6 and out through gate 2 onto the inner edges of the operator's table 3.

As the tray descends it over-runs the trip lever or trigger 125 that pushes down contacts 131 (see Fig. 24) opening up the circuit through contacts 132 and 133. This breaks the two branch circuits to the grounds G₂ and G₃ through the magnet coils 206 for the intermediate panel 181. So this panel becomes raised by its springs 188 (see Fig. 7).

As already described, the tally circuit is closed when all three of the panels descend at the start of a delivery operation.

When this "tally circuit" is closed through the coil 149 (see Fig. 29) the head 147 that carries it becomes magnetized and pulls itself toward the right as viewed in Fig. 29. As head 147 moves toward the right, it shorts out its coil 149 by pushing contact 167 over against fixed contact 165 which is grounded through wire 248. Wire 152a connects brush 152 to floating contact 168.

Referring to Figs. 28 and 29, it should be said that the period of time during which the tally circuit through coil 149 is maintained, must be long enough to insure that the arm 154 will complete its swing over to the electromagnet 159 before the contact head 167 shorts out coils 159 and 149. The arm 154 rocks the shaft 140 of the platen and also the head 150. By reason of the fact that the platen is friction-tight on its shaft, the shaft will rotate it in one direction. A spring-pressed detent pawl 139a meshing with ratchet teeth 139b permits rotation of the platen in one direction only.

The bottom of a delivered tray lying on the table, rests on the trigger 125 which is held down by it, so that contacts 132 and 133 remain unconnected until the tray is pushed back up its ramp. Hence the circuit through coil 149 (Fig. 29) is broken, to permit the return of the head 147 to its normal position by its spring 168. When coil 159 is energized it actuates the tally sheet 138 as already described, to advance it through one line space so that the next number to appear at the reading point such as the number N, indicating that the next rotation key to be depressed is the "5" key, and the next leveling key is the "4" key. This occurs, however, when switch S is closed.

When the tray is pushed back after the operator is through with it, the back end of the tray compresses the ejection spring 137. And latch 111 automatically relatches it in place.

When the tray moves off of the trigger 125, switch 128 (Fig. 24) closes again. And the apparatus is ready to operate again. If it should happen, by chance, that the operator of the machine requires again, the tray that he has just returned to its pigeon hole, that tray will be automatically released and delivered to him when he depresses the keys corresponding to it; as all switches will then be properly set to accomplish that, and no movements of the holder 1 will be effected in doing this.

Many other embodiments of the invention may be resorted to without departing from the spirit of the invention.

I claim as my invention:

1. In apparatus for delivering a desired article to a receiving station, the combination of storage means including a series of pockets for such articles, said series being disposed in tiers at relatively different levels with respect to the level of the receiving station, means for mounting the storage means so as to enable the same to be rotated about an axis to bring any desired article to a position in substantial alignment in a vertical plane with the said station, control-means including selectable members corresponding respectively to the different tiers and the pockets in the tiers, operatable at the will of the operator; and selective means controlled thereby for effecting an angular rotation of the storage means about said axis through the minimum angle necessary to bring it into the said vertical alignment with the said station; and means also controlled by the said control-means for moving the storage means up or down to bring the tier in which the desired article is located, to the substantial level of said station.

2. Apparatus for delivering a desired article to a receiving station, according to claim 1, in which the leveling means and the rotating means are constructed so as to be capable of operating independently of each other and simultaneously with each other.

3. Apparatus for delivering a desired article to a receiving station, according to claim 1, including a bank of keys corresponding to the relative angular position of said articles respectively, with respect to said axis, and a bank of keys corresponding to the level of different articles respectively, with reference to the elevation of said station.

4. In apparatus for delivering a desired article to a receiving station, the combination of storage means for a plurality of articles with the articles separately located at different levels with respect to the level of the receiving station, means for mounting the storage means so as to enable the articles to be rotated about an axis to bring any desired article to a position in substantial alignment with the said station, a bank of keys corresponding to the different articles with respect to their angular relation to each other about said axis, means brought into operation by the depression of individual keys for effecting a rotation of the desired article about the said axis of rotation to bring the same into angular alignment with said station, a bank of keys corresponding to the articles with respect to their relation to the level of said station, and means controlled by said last named keys for effecting movement of the desired article to the level of said station.

5. In apparatus of the kind described, the combination of a receiving station, a holder having pockets capable of olding and carrying articles for delivery at the receiving station, means for supporting the holder for rotation about a vertical axis, means for effecting changes of level of the holder bodily up or down to bring any article in said pockets to the level of the station, a bank of leveling control keys, a control part mounted to move in unison with the holder, a plurality of movable stops corresponding respectively, to said keys, means controlled by the individual keys for setting a stop corresponding to it in a position to cooperate with said control part when the holder has moved sufficiently to bring the control member into juxtaposition with the said stop, and means activated by the arrival of the said control part in a position opposite to the said stop for ceasing the leveling movement of the holder.

6. Apparatus for delivering a desired article to a receiving station, the combination of a substantially circular holder having a plurality of pockets for the articles disposed in vertical rows, and in transverse substantially horizontal rows in which the pockets are spaced in an angular direction from each other, a receiving station adjacent to the side of said holder, a keyboard including a bank of orienting keys corresponding respectively to the pockets in the horizontal rows, a bank of leveling keys corresponding respectively to the pockets in said vertical rows, means controlled by the orienting keys for effecting rotation of the holder to bring a vertical row of pockets corresponding to a depressed orienting key into substantial angular alignment with the said station, and means controlled by a depressed leveling key to raise or lower said holder to bring the horizontal row of pockets corresponding to that key, to the level of said station.

7. Apparatus for delivering a desired article to a receiving station according to claim 6, including a clutch-assembly with means actuated through the clutch for effecting the orienting of said holder in either direction, and a second clutch-assembly with means actuated therethrough for raising or lowering said holder to bring the pocket carrying the desired article to the level of said station.

8. Apparatus for delivering a desired article to a receiving station according to claim 6, including a clutch-assembly with means actuated through the clutch for effecting the orienting of said holder in either direction, a second clutch-assembly with means actuated therethrough for raising or lowering said holder to bring the pocket carrying the desired article to the level of said station, electric circuits with means for controlling said clutch-assemblies thereby to enable them to impart movement in either direction to the holder, a selective switch for controlling the circuits for the first named clutch assembly, and a selective switch for controlling the circuits for the second named clutch-assembly, said selective switches having control parts moving in unison with the orientation and with the raising and lowering movements of said holder.

9. Apparatus for delivering a desired article to a receiving station, the combination of a substantially circular holder having a plurality of pockets for the articles disposed in vertical rows, and in transverse substantially horizontal rows in which the pockets are spaced in an angular direction from each other, means for counterbalancing the weight of said holder, a receiving station adjacent to the side of said holder, a keyboard including a bank of orienting keys corresponding respectively to the pockets in the horizontal rows, a bank of leveling keys corresponding respectively to the pockets in said vertical rows, means controlled by the orienting keys for effecting rotation of the holder to bring a vertical row of pockets corresponding to a depressed orienting key into substantial angular alignment with the said station, and means controlled by a depressed leveling key to raise or lower said holder to bring the horizontal row of pockets corresponding to that key, to the level of said station.

10. In apparatus of the kind described, for selecting and delivering articles to a receiving station, the combination of means for supporting a plurality of the articles, hand-controlled leveling means for selecting a desired article and for moving the same to the level of the receiving station, hand-controlled lateral moving means for moving the article laterally to bring the same into position opposite said station, said leveling means and lateral movement means being constructed so that the said two movements take place simultaneously.

11. Apparatus of the kind described, for selecting and delivering articles to a receiving station, according to claim 10, in which the hand-controlled means comprise two banks of keys, one of said banks controlling the leveling means, and the other controlling the lateral moving means.

12. Apparatus of the kind described, for selecting and delivering articles to a receiving station, according to claim 10, in which the hand-controlled means comprise two banks of keys, one of said banks controlling the leveling means, and the other controlling the lateral moving means, and means for automatically inhibiting the effect of the actuation of a second key in either of said banks of keys, after one key in that bank has been actuated.

13. In apparatus of the kind described, for delivering selected articles to a receiving station, the combination of means for supporting a plurality of the articles disposed in vertical rows and substantially horizontal tiers, a bank of leveling keys corresponding respectively to the different tiers, means controlled by said "leveling" keys including a direction switch for determining the direction of movement of a desired article and for moving the same to the level of the receiving station, a bank of "lateral movement" keys corresponding respectively to the said vertical rows, means controlled thereby including a direction switch for effecting the movement of the selected article to bring the same into position opposite the receiving station.

14. Apparatus of the kind described, according to claim 13, including automatic means for effecting the release of the article from its supporting means when the article has been brought to the receiving station.

15. In apparatus of the kind described, for delivering selected articles to a receiving station, the combination of means for supporting a plurality of the articles disposed in vertical tiers and substantially horizontal rows, a bank of leveling keys corresponding respectively to the different rows, means controlled by said leveling keys including a selecting switch for determining the direction of movement of a desired article, and for effecting the movement of the same to the level of the receiving station, a bank of "lateral movement" keys corresponding respectively to the said vertical rows, means controlled thereby including a selecting switch for effecting movement of the selected article to bring the same into position opposite the receiving station, a panel corresponding to the "leveling" keys, a second panel corresponding to the "lateral movement" keys, means for effecting movements of said panels by the keys of their respective sets, electric circuits for cooperating in the delivery of the article to the receiving station, and contact means controlled by said panels for closing said circuits.

16. Apparatus of the kind described, according to claim 15, including means controlled by the circuits for depressing a panel corresponding to the leveling key before a leveling key is depressed, and for effecting the depressing of the second named panel before one of the "lateral movement" keys is depressed.

17. Apparatus of the kind described, according to claim 15, including means controlled by the circuits for depressing a panel corresponding to the leveling key before a leveling key is depressed, and for effecting the depressing of the second named panel before one of the "lateral movement" keys is depressed, and means for effecting the release of said panels and for returning the same to a raised position when the desired article passes off of its supporting means at the receiving station.

18. In apparatus of the kind described, for delivering selected articles to a receiving station, according to claim 15, including a holder for supporting and carrying the selected article, electro-mechanical means for latching the article in the holder, and a circuit for energizing the electro-mechanical means to release the said latch, said last named circuits having switches in the same closed through the agency of the movement of both of said panels.

19. In apparatus for effecting the storage and delivery of selected articles, the combination of a holder for articles, mounted for rotation about a vertical axis, and having circumferentially disposed pockets for the separate articles, a set of keys, a plurality of circumferentially disposed electro-magnets corresponding respectively to said keys, and disposed about a central axis, an arm mounted to swing on said axis in unison with said holder, a pair of switches on said arm located respectively toward the lateral sides of said arm, a plurality of movably mounted stop members corresponding respectively to said electro-magnets normally disposed out of the path of movement of said switches and capable of being attracted magnetically by the electro-magnets, electric circuits through said electro-magnets capable of being closed respectively by said keys, so that any one of said stop members is capable of being attracted by, and moved toward, its corresponding electro-magnet to become "set" into the path of said switches, an insulated contact segment corresponding to each of said switches with two diametrically opposite insulation gaps between the segments located in diametric alignment with said arm, said segments mounted to move in unison with said arm, a circuit corresponding to each of said switches passing through its corresponding contact segment, a receiving station alongside said holder, means controlled by said last named circuits respectively for rotating the holder to swing a selected article within it into vertical alignment with the receiving station, and means associated with each of said stop members for opening one or the other of said switches carried by said arm, when the arm moves into position to cooperate with one of said stop members, thereby opening the closed circuit that effected the rotation of the holder, to stop the holder.

20. Apparatus for effecting delivery of selected articles to a receiving station, according to claim 19, including means for maintaining the first switch touched, in its open position if the moving arm carrying the switches moves past the point where one of said switches has been opened by the "set" stop member.

21. Apparatus for effecting the delivery of selected articles to a receiving station, according to claim 19, including a holder for supporting and carrying a selected article, electro-mechanical means for latching the article on said holder, a control circuit therefor, and automatic means controlled by the depression of the key for closing the control circuit at one point, to cooperate in releasing said latching means.

22. In apparatus for effecting the delivery of selected articles to a receiving station, the combination of a bank of "leveling" keys, a panel corresponding to said keys, a bank of "lateral movement" keys, a second panel corresponding to said last named bank of keys, a holder for supporting and carrying the articles, a "lateral movement" selecting switch having a plurality of stop devices spaced circumferentially about an axis and including a rotary switch-carrying member, a switch carried by the same, electro-mechanical means controlled by said keys for setting up any one of said stop devices adjacent the path of said switch, a pair of contact segments on said member located respectively at each side of said switch, means controlled through the agency of one of said segments for effecting movement of the holder in one direction, and means controlled through the agency of the other of said segments for effecting movement of the holder in the opposite direction, electro-mechanical panel magnets corresponding to said first named panel connected in circuit for depressing the panel, means controlled by the second bank of keys for effecting the movement of said holder to the level of said receiving station, electro-mechanical panel magnets connected in circuit for depressing the second panel, means for closing the magnet circuits to effect the depression of said second panels, a circuit to cooperate with the foregoing means in effecting the delivery of the selected article to said station, and means for effecting opening the said switch to open the circuit through the first named panel magnets when the said holder has completed its lateral movement.

23. In apparatus of the kind described, the combination of a rotatably mounted shaft, a cylindrical article holder having pockets spaced equidistantly at the same level around its periphery for the articles, said holder operatively connected to the shaft to rotate in unison therewith, a plurality of normally inactive movably mounted stops corresponding respectively to said pockets and spaced equidistantly from each other around the axis of said shaft, a pair of arcuate segments insulatingly supported on the shaft and having two diametrically opposite gaps between them, a radially extending arm rigid with the shaft and in line radially with said gaps, a first switch carried toward one side of said arm, and a second switch carried toward the other side of said arm, a plurality of keys corresponding respectively to said stops, an electrically controlled 2-direction driving mechanim normally inactive and capable of driving said shaft and holder forward or in reverse, a plurality of electromagnets corresponding to the stops for moving any one of the same into a "set" active position in line with the path of said arm switches, a brush corresponding to each stop for closing circuit to said segments, a circuit adapted to be closed by any of said keys through a corresponding electromagnet to move its corresponding stop into a "set" position in the path of said arm switches, said circuit passing through one of said segments, through one of said arm switches and through said electrically controlled 2-way direction driving mechanism, and actuating the same to effect the driving of the shaft in a direction to cause the arm to approach the "set" stop; each stop having means in the path of the arm switches for opening the first of the arm switches to reach and contact the same, thereby opening said circuit to stop the rotation of said shaft and the holder.

24. Apparatus of the kind described according to claim 23, including means associated with said arm switches to maintain the same open after they have been opened by the said means on the said "set" stop.

References Cited in the file of this patent

UNITED STATES PATENTS

| | | |
|---|---|---|
| 997,965 | Cobb | July 18, 1911 |
| 1,072,007 | Hick | Sept. 2, 1913 |
| 1,962,731 | Bryce | June 12, 1934 |
| 2,150,216 | Fuller | Mar. 14, 1939 |
| 2,235,736 | Bruen | Mar. 18, 1941 |
| 2,384,355 | Torrence | Sept. 4, 1945 |
| 2,386,520 | Watson et al. | Oct. 9, 1945 |
| 2,504,629 | Bertello | Apr. 18, 1950 |

FOREIGN PATENTS

| | | |
|---|---|---|
| 192,714 | Great Britain | Sept. 13, 1923 |

OTHER REFERENCES

Serial No. 273,370, Becker (A. P. C.), published April 27, 1943.